Patented Feb. 17, 1942

2,273,452

UNITED STATES PATENT OFFICE 2,273,452

METHOD OF UNITING SURFACES

James E. Snyder, Akron, Ohio, assignor to Wingfoot Corporation, Wilmington, Del., a corporation of Delaware No Drawing. Application July 26, 1938, Serial No. 221,398

4 Claims. (Cl. 154—42)

This invention relates to the uniting of rubber hydrochloride surfaces, and more particularly to the forming and/or the sealing of packages made from rubber hydrochloride film or a backing material such as paper, cloth, etc. coated with rubber hydrochloride. It has previously been suggested that such packages can be conveniently sealed by the application of pressure with sufficient heat to soften the rubber hydrochloride and render it adhesive. It has also been suggested that photographic films of rubber hydrochloride may be spliced together by the use of such solvents as acetylene tetrachloride, chloroform, benzol or a combination of these solvents. The latter suggestion is found in Bradley and McGavack U. S. Patent 1,519,659 and relates only to the use of materials which are solvents for rubber hydrochloride at ordinary temperatures. Moreover the solvents suggested in this patent are toxic and therefore cannot be employed in the usual packaging operations.

According to this invention the rubber hydrochloride surfaces which are to be united are first treated with a swelling agent, such as toluene, the treated surfaces are then pressed together and heated to a sufficiently high temperature to cause them to coalesce. The method is applicable to the forming and sealing of bags composed entirely of rubber hydrochloride film and bags composed of paper, cloth or other flexible backing material coated with rubber hydrochloride, and to the formation and sealing of other types of packages by uniting exposed surfaces of rubber hydrochloride.

Instead of employing toluene other low boiling swelling agents such as carbon tetrachloride, ethylene dichloride, xylene, ethyl acetate, etc. may be employed. Unless the rubber hydrochloride is heated when treated with these agents it does not become sufficiently tacky to form a good seal, but when heated the treated rubber hydrochloride surfaces coalesce and become firmly united. This method of uniting rubber hydrochloride surfaces provides a thoroughly commercial method of packaging which can readily be used in large scale packaging operations where large numbers of units are sealed within a short interval of time. Furthermore, packaging machinery now in use which is not suitable for heat-sealing rubber hydrochloride packages without the use of a swelling agent can readily be used for heat-sealing when a swelling agent such as those mentioned is used. Packaging machines with stationary heat-sealing platens have not given altogether satisfactory performance on rubber hydrochloride wraps, etc. because the temperature required for heat-sealing without a swelling agent is so high that the outer surface of the rubber hydrochloride becomes tacky and sticks to the heater plates, also the wraps on adjacent packages are sealed together on the sides of the packages as they slide past the hot plates.

The sealing of packages as herein described offers many advantages over more common methods used in the formation of packages. It entirely eliminates the use of sticky adhesives. The seal is instantly formed and "sets" immediately. The bond formed is very strong and neat appearing. The cost is low, particularly where toluene is employed, and for this and other reasons toluene is the preferred swelling agent.

The swelling agent to be effective is applied to the under surface of each fold of the wrap, etc. It may be applied to either one or both of the rubber hydrochloride surfaces which are to be united. The under surface of the fold, etc. never contacts with the hot plate of the packaging machine. In the packaging operation, the exposed surface of the fold is pressed against a hot surface, or a hot surface is pressed against the exposed surface of the flap. The hot surface may be a stationary hot plate or a suitable moving sealing member. The fold is thus heated and the swelling agent causes the rubber hydrochloride on the under surface of the fold to cohere to the other rubber hydrochloride surface which is in contact with it. The swelling agent is preferably low boiling and is entirely or practically entirely volatilized before the package and hot plate are separated. The seal is formed practically instantaneously.

When no swelling agent is employed it is necessary to heat the surface of the film which comes in contact with the hot plate to the sealing temperature. Therefore a considerably higher temperature is necessary than when a swelling agent is employed. At this higher temperature the film, which is softened by the heat, remains soft for a considerable period of time, several hours, and until the film cools and "sets" so that the heated portion is no longer soft and readily stretchable, the package must be handled with care. The temperature required for sealing with a swelling agent is less and the bond formed is relatively inelastic. This is of particular importance where film alone is used for packaging, unbacked by paper or fabric. Another advantage in the use of swelling agent plus low heat, where unbacked film (i. e. a pellicle) is used, is that when high heat alone is employed the outer heated rubber hydrochloride surface is tacky and it remains tacky for a considerable period. When a swelling agent is used the rubber hydrochloride is never heated to the point where the outer surface is tacky. There is therefore no possibility of adjacent packages being joined together by fusion of contacting rubber hydrochloride surfaces in wrapping or packing.

The invention will be described in connection with the use of toluene in wrapping a package with an unplasticized sheet of rubber hydrochloride film .0012 inch thick. The film may be stabilized with a photochemical inhibitor such as described in Calvert 1,989,632. The package may be of any design or shape commonly wrapped with the usual wrapping materials. It may be wrapped by hand or by machine. The rubber hydrochloride sheet is cut to the proper size and wrapped around the package. Toluene is applied to one of the contacting surfaces of each over-lap, tuck and fold as the wrapping operation progresses and is completed. The seams are then heated and lightly pressed together by contact with a surface maintained at approximately 175° F. The temperature required varies, depending upon the time of contact, the pressure, the type and thickness of the rubber hydrochloride, the number of folds pressed together at any one time, the nature of the heating surface and other factors. Different temperatures apply to different swelling agents. The temperature range is relatively narrow for satisfactory results and is usually limited to plus or minus 15° F. from the established desideratum where the time of heating is limited to seconds or a fraction of a second as in automatic machine wrapping. The correct temperature lies between the minimum where unsatisfactory strength of bond results and the maximum where the outer surface of the rubber hydrochloride becomes tacky. The heat may be applied by convection of hot air or other means.

The wrapper may be pigmented, colored and plasticized, etc. as desired. Where plasticizers are used the temperature of heating may be somewhat below that required for unplasticized film.

When the rubber hydrochloride is backed by paper, cloth or the like, the folds are made so that rubber hydrochloride surfaces are in contact with rubber hydrochloride surfaces. Since the heat is to be applied to the backing and transmitted to the rubber hydrochloride through the backing, the temperature of the hot plate or other heating agent must be somewhat higher than when the hot plate is brought into contact with unbacked film.

Although the invention has been described more particularly as applied to the wrapping of a package, it may be used also in the forming and sealing of bags, whether the bags are made of film, or paper or cloth coated with rubber hydrochloride, and in other operations where two rubber hydrochloride surfaces are to be united.

In the claims the expression "normal room temperature" is used to refer to a temperature about 60 to 90° F.

I claim:

1. The method of bring two rubber hydrochloride surfaces together and uniting a limited area of said surfaces which comprises treating only said limited area of at least one of said surfaces with a low boiling organic liquid swelling agent which does not rapidly render the rubber hydrochloride tacky at normal room temperature but causes the rubber hydrochloride to become tacky almost immediately when heated to an elevated temperature below that required to cause untreated rubber hydrochloride to become tacky, bringing the two surfaces together and then while applying pressure, supplying to areas of said surfaces larger than, and including, said limited areas sufficient heat to cause said treated limited areas to coalesce, but not supplying sufficient heat to cause the untreated surfaces to become tacky.

2. The method of uniting two rubber hydrochloride surfaces which comprises treating at least one of the surfaces with an organic liquid swelling agent which readily volatilizes in air below the temperature at which rubber hydrochloride becomes tacky but does not cause the rubber hydrochloride to become tacky at normal room temperature, bringing the surfaces together and applying pressure thereto while heating to a sufficient temperature and for a sufficient time to cause the surfaces to coalesce by heating the rubber hydrochloride to a temperature below that at which untreated rubber hydrochloride becomes tacky and simultaneously effecting substantially complete volatilization of the swelling agent.

3. The method of packaging which comprises uniting two surfaces of rubber hydrochloride film by treating at least one of the surfaces where the union is to be effected with toluene and then forming the union with pressure while heating the treated portion to a temperature at which union of the rubber hydrochloride surfaces is there effected, but without heating to a temperature at which the untreated surfaces will be united.

4. In the formation of a package from rubber hydrochloride film the method of uniting overlapping portions of the film which comprises treating at least one of the film surfaces to be united with a low-boiling organic liquid swelling agent which does not render the rubber hydrochloride tacky at normal room temperature but causes the rubber hydrochloride to become tacky when heated to a temperature below that required to cause untreated rubber hydrochloride to become tacky, bringing the two surfaces together and by bringing the outside surface into sliding contact with a heated surface, heating the treated rubber hydrochloride so as to render it tacky and to volatilize the solvent but without heating the rubber hydrochloride to the temperature at which untreated rubber hydrochloride becomes tacky.

JAMES E. SNYDER.